(12) United States Patent
Buchberger et al.

(10) Patent No.: US 8,047,227 B2
(45) Date of Patent: Nov. 1, 2011

(54) PRESSURE LIMITING VALVE

(75) Inventors: Thomas Buchberger, Linz (AT); Franz Weixelberger, Vienna (AT); Wolfgang Hoeller, Kirchham (AT)

(73) Assignee: Robert Bosch GmbH, Stuttgart (DE)

( * ) Notice: Subject to any disclaimer, the term of this patent is extended or adjusted under 35 U.S.C. 154(b) by 209 days.

(21) Appl. No.: 10/549,576

(22) PCT Filed: Oct. 6, 2003

(86) PCT No.: PCT/DE03/03300
§ 371 (c)(1),
(2), (4) Date: Nov. 17, 2006

(87) PCT Pub. No.: WO2004/083695
PCT Pub. Date: Sep. 30, 2004

(65) Prior Publication Data
US 2007/0079878 A1    Apr. 12, 2007

(30) Foreign Application Priority Data
Mar. 19, 2003   (DE) .................. 103 12 175

(51) Int. Cl.
*F16K 15/06* (2006.01)
*F16K 17/06* (2006.01)
*F16K 21/04* (2006.01)
(52) U.S. Cl. .............. 137/543.13; 137/538; 137/470
(58) Field of Classification Search .......... 137/538, 137/470, 542, 543.13, 543.19, 543.23; 251/205, 251/206
See application file for complete search history.

(56) References Cited

U.S. PATENT DOCUMENTS

| | | | | |
|---|---|---|---|---|
| 2,498,482 | A * | 2/1950 | Cadman et al. | 137/513 |
| 2,672,881 | A * | 3/1954 | Jay et al. | 137/470 |
| 3,199,533 | A * | 8/1965 | Fountain-Barber | 137/543.13 |
| 3,339,579 | A | 9/1967 | Lewis et al. | |
| 3,346,009 | A * | 10/1967 | Lindeboom | 137/543.17 |
| 4,313,463 | A * | 2/1982 | Weirich | 137/538 |
| 4,413,646 | A * | 11/1983 | Platt et al. | 137/240 |
| 4,456,028 | A | 6/1984 | Watson | |
| 5,002,090 | A * | 3/1991 | Ichikawa et al. | 137/550 |
| 5,241,986 | A * | 9/1993 | Yie | 137/512 |
| 6,314,753 | B1 * | 11/2001 | Hirota et al. | 62/528 |
| 6,523,913 | B1 * | 2/2003 | Lauer et al. | 303/119.2 |
| 6,953,053 | B2 * | 10/2005 | Waffler et al. | 137/538 |

FOREIGN PATENT DOCUMENTS

| | | |
|---|---|---|
| DE | 1 148 511 | 5/1963 |
| DE | 28 18 581 A1 | 10/1979 |
| DE | 31 48 454 A1 | 6/1982 |
| DE | 35 08 986 A1 | 9/1985 |
| DE | 87 11 115 U1 | 9/1987 |
| DE | 196 04 889 A1 | 8/1997 |
| DE | 199 55 083 A1 | 5/2001 |
| EP | 0 241 952 A1 | 10/1987 |
| EP | 0 305 177 A1 | 3/1989 |
| GB | 2 116 293 A | 9/1983 |

* cited by examiner

Primary Examiner — Stephen M Hepperle
Assistant Examiner — Atif Chaudry
(74) Attorney, Agent, or Firm — Ronald E. Greigg

(57) ABSTRACT

The invention relates to a pressure limiting valve. The pressure limiting valve comprises a valve holder a valve insert connected to the valve holder a valve piston slidably supported in the valve insert and a compression spring acting on the valve piston in the closing direction. Between the valve piston and the compression spring an adjusting shim is disposed such that the compression spring is braced on one end on a bottom piece of the valve holder and on the other on a face of the adjusting shim facing away from the valve piston.

16 Claims, 8 Drawing Sheets

PRESSURE LIMITING VALVE

CROSS-REFERENCE TO RELATED APPLICATIONS

This application is a 35 USC 371 application of PCT/DE 03/03300 filed on Oct. 6, 2003.

BACKGROUND OF THE INVENTION

1. Field of the Invention

The invention relates to a pressure limiting valve and more particularly to an improved pressure limiting valve suitable for use fuel injection systems.

2. Description of the Prior Art

A pressure limiting valve in conjunction with a device for injecting fuel, in particular Diesel fuel, is known from the book entitled Diesel-engine Management, Stuttgart 1999, page 273 (ISBN 0-7680-0509-4). A pressure limiting valve of this type serves to limit pressure yet at the same time furnish an emergency operation capability. Preferably, the pressure limiting valve of this type is used in conjunction with common rail systems.

Mass-produced pressure limiting valves are already known in which spring washers and valve pistons are embodied in one piece and disposed together with a compression spring in a cup-shaped valve holder. On its end piece remote from the valve piston, the valve holder has an adjusting screw with a check nut, by way of which the valve characteristic can be adjusted and production variations can also be compensated for. Aside from the complicated and expensive construction, these known valves require a relatively large installation volume, which makes it difficult to integrate them into component groups of an injection system. Moreover, these known valves have the disadvantage of regulating down to a pump feeding quantity of only about 90 liters/hour. At a lower flow rate, such a pressure limiting valve closes again. However, this causes severe restrictions in emergency operation.

SUMMARY OF THE INVENTION

The pressure limiting valve of the invention is distinguished by having only a few parts, which can also be produced economically. Because of the separation provided according to the invention between the spring washer and the piston, the possibility also exists of adjusting the opening pressure in a simple way and compensating for production variations. Moreover, the invention offers the advantage in particular that even at a comparatively low pump rpm and a slight flow rate, stable emergency operation is made possible. A pressure curve is furnished that is virtually independent of the flow rate. The pressure limiting valve equipped according to the invention is furthermore distinguished by having only a very small size. This makes it possible to install it into component groups of the injection system, such as a rail or pump, in which only little installation space is available. Because of the flat places provided on the piston of the pressure limiting valve, an adequate flow cross section for major pump feeding quantities is furnished.

BRIEF DESCRIPTION OF THE DRAWINGS

The invention will be described in detail below, in conjunction with the drawings, in which.

DESCRIPTION OF THE PREFERRED EMBODIMENTS

Figure 1:
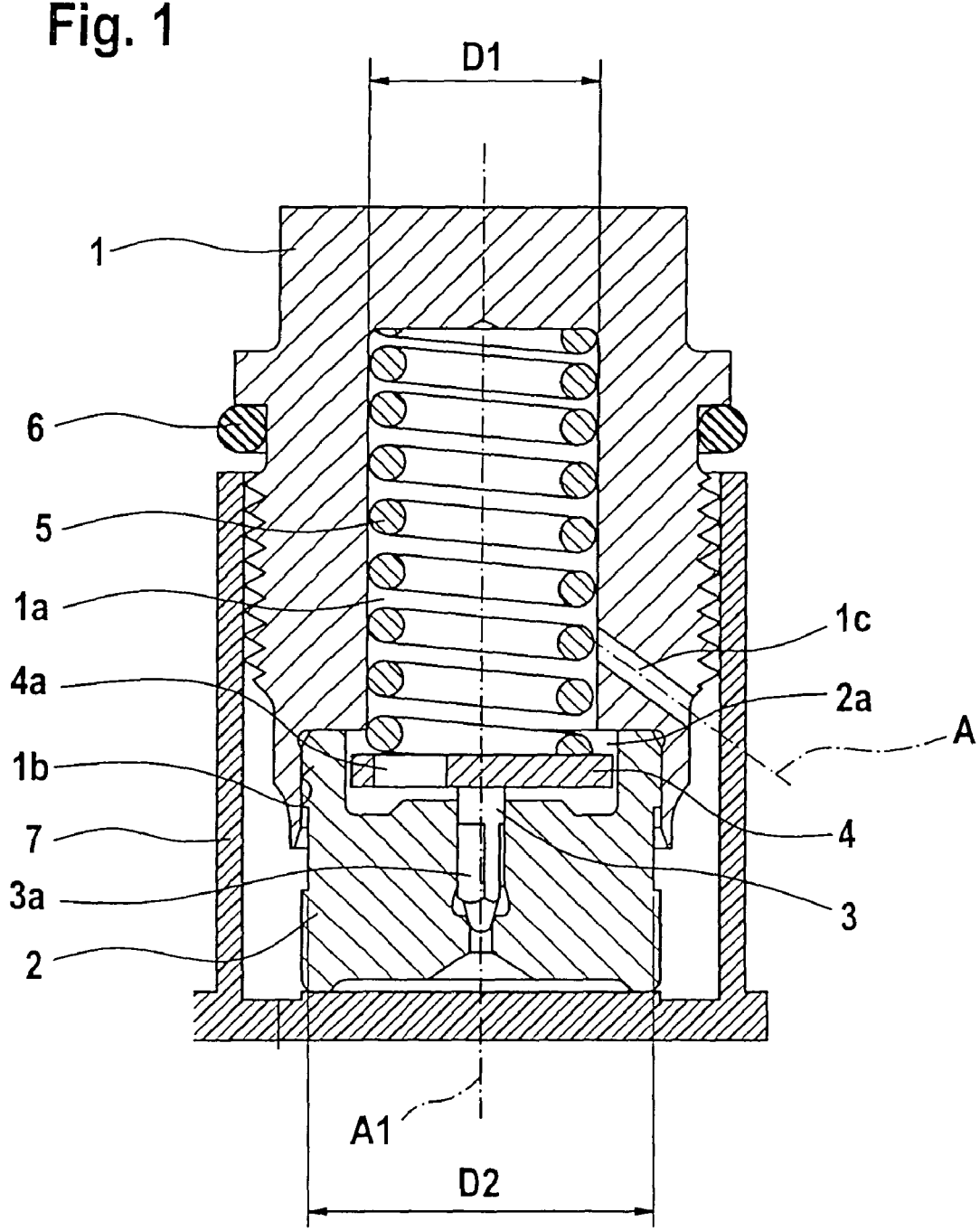
FIG. 1 is a sectional view of a first exemplary embodiment of a pressure limiting valve according to the invention.
Figure 3:
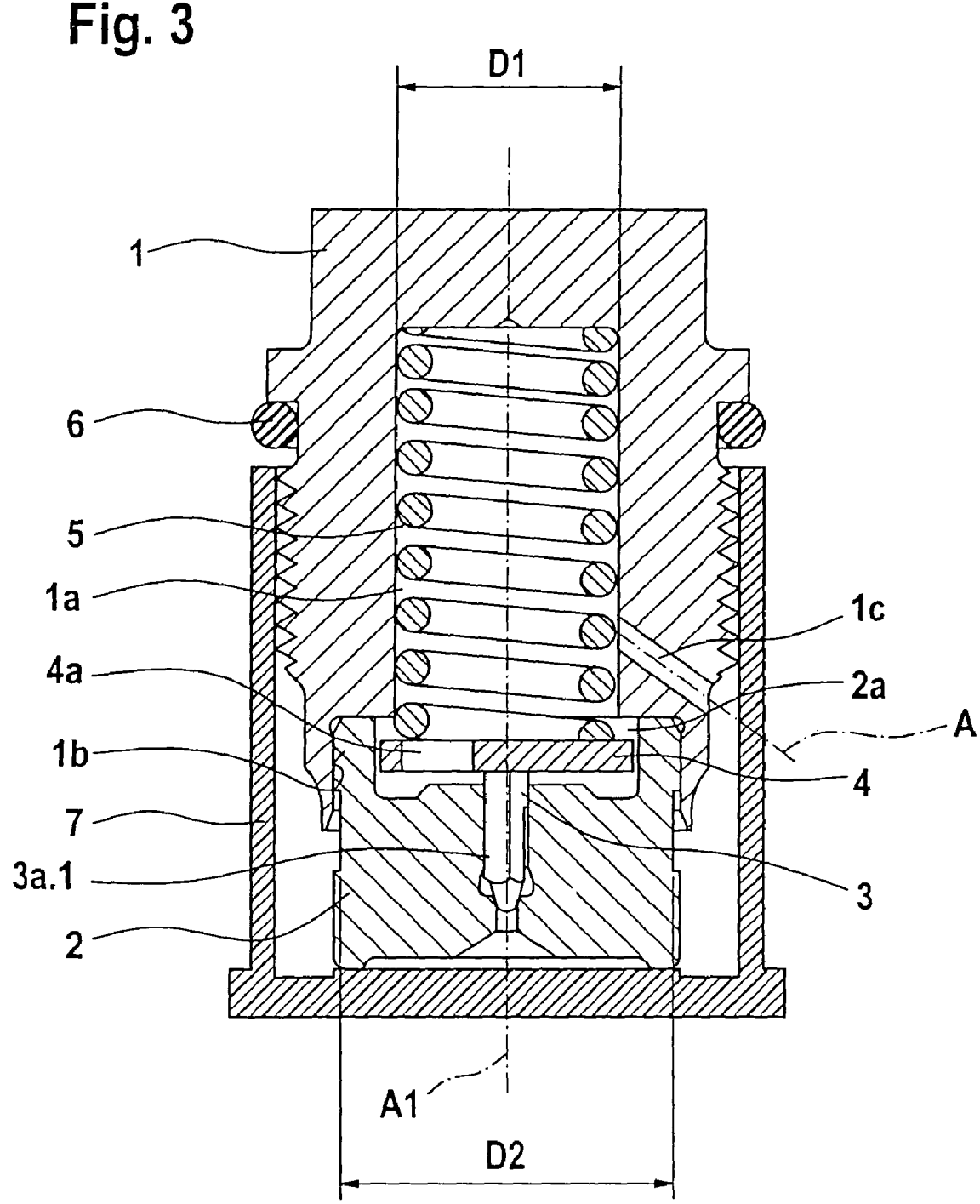
FIG. 3, a second exemplary embodiment of a pressure limiting valve with flat places of different lengths on the piston.

FIG. 1 shows a first exemplary embodiment of a pressure limiting valve embodied according to the invention that is especially well suited to emergency operation as well. The pressure limiting valve 10 includes a valve holder 1, which is embodied as essentially cup-shaped, and includes two subregions 1a, 1b of different inside diameters D1, D2. The subregions 1a, 1b each extend over part of the total length of the valve holder 1 and merge in steplike fashion with one another. The subregion 1a of the valve holder 1 having the lesser inside diameter D1 is next to the bottom of the valve holder 1. The subregion 1b of the valve holder having the larger inside diameter D2 is oriented toward a valve insert 2. The subregion 1a of the valve holder 1 serves to receive a compression spring 5. The subregion 1b of the valve holder 1 embraces the valve insert 2 from outside and establishes the connection between these two parts. Preferably, the valve insert 2 is calked to the valve holder. This type of fastening can be done economically on a mass-production scale and has proven itself to be sufficiently reliable. Alternatively, however, it is also conceivable to provide the valve holder 1 and the valve insert with a suitable thread and to screw the two parts together. This type of connection will not be as economical but on the other hand would offer the advantage of a further degree of freedom for compensating for production variations. That is, by twisting the parts 1, 2 more or less markedly, the prestressing exerted on the compression spring 5 could be varied. A valve piston 3 is slidably supported in a bore disposed centrally in the valve insert. Between the compression spring 5 and the valve piston 3, an adjusting shim 4 is disposed such that the compression spring 5, resting in the subregion 1a of the valve holder, is braced on one end on the bottom of the valve holder 1 and on the other on the side face, remote from the valve piston, of the adjusting shim 4. The compression spring 5 acts on the valve piston 3 in the closing direction indirectly via the adjusting shim. The adjusting shim 4 itself is slidably supported in a cup-shaped recess 2a disposed in the valve insert 2. Upon an opening or closing motion of the valve piston 3, this piston is moved up and down and in the process is guided by the wall of the cup-shaped recess 2a. The steplike transition of the valve holder 1 formed by the different diameter regions (diameters D1, D2) rests on the valve insert 2 and protrudes radially inward. This creates a stop for the adjusting shim 4. When pressure is exerted on the valve piston 3 acting counter to the compression spring 5, the adjusting shim 4 can move at most as far as the stop and thus also prevents the valve piston 3 from being lifted excessively far from its seat in the valve insert 2. The adjusting shim 4 has a fluid-passable recess or opening 4*a*, which is preferably disposed eccentrically in the adjusting shim, in order to assure good bracing of the valve piston 3 on the adjusting shim 4. Through this recess 4*a*, once the valve piston 3 has lifted from its seat, fuel can flow into the subregion 1*a*, accommodating the compression spring 5, of the valve holder. At least one outflow conduit 1*c* is provided in the wall of the valve holder 1 and is expediently embodied as a bore connecting the subregion 1*a* of the valve holder to its outer jacket face. This outflow conduit 1*c* is preferably disposed horizontally (FIG. 3). However, as shown in FIG. 1, it may also be let into the wall of the valve holder 1 in such a way that it extends obliquely. That is, the axis A of the outflow conduit 1*c* and the longitudinal axis A1 of the valve holder are oriented at an angle to one another, specifically and preferably such that an acute is defined between the axis A and the direction of the longitudinal axis of the valve piston 3. A sealing means, preferably an 0-ring 6, is also disposed on the outer jacket face of the valve holder 1, resting in a seat. A protective cap 7 is also shown, which protects the pressure limiting valve 10 from damage and contamination during storage and while being transported until it is installed.

The compression spring 5 and the hydraulically active seat diameter, which results from the contacting edge of the valve insert 2 and the valve piston 3, are adapted to one another such that a predeterminable opening pressure P1 results. This opening pressure P1 can be adjusted especially advantageously by means of the adjusting shim 4. By means of adjusting shims 4 of different thickness, unavoidable production variations can be compensated for easily. The simply constructed parts of the pressure limiting valve 10 can be economically produced and kept on hand. The desired pressure for the emergency operation is adapted in a simple way in cooperation between the guide diameter of the valve piston 3 in the valve insert 2 and the diameter of the valve seat. In addition, the valve piston 3 has flat places 3*a* disposed on its outer circumference. In an especially advantageous embodiment of the pressure limiting valve 10, a total of three flat places 3a are provided, which are distributed uniformly over the circumference of the valve piston 3. The limits to usability at high flow rates are set by the cross section of these flat places 3*a*. The spring force of the compression spring 5 urges the adjusting shim 4 and thus the valve piston 3 in the closing direction. Beyond a defined value of the pressure, the spring force of the compression spring 5 no longer suffices to keep the pressure limiting valve 10 closed. This value for the pressure, called the opening pressure, in a second generation common rail system, is between about 1850 and 1950 bar. This pressure value can be established in a simple way by means of a suitably dimensioned adjusting shim 4. Once the opening pressure is reached, the valve piston 3 lifts from its seat in the valve insert 2, and a pressure builds up in the chamber enclosed by the valve piston 3 and the valve insert 2. Because of the larger hydraulically active surface area, the valve piston slides so far out of the valve insert 2 that the flat places 3*a* made on the valve piston 3 become operative, and the fuel can flow out via the open cross-sectional areas. Via the flat places or control edges machined into the valve piston 3, the characteristic curve for emergency operation is regulated. Ideally, the pressure limiting valve 10 would not close again until at a flow rate of about 15 liters/hour. Beyond the instant of closure, the function of the pressure limiting valve 10 becomes unstable. If the play between the valve piston 3 and the valve insert 2 were increased, then the pressure limiting valve 10 would for instance already close at a flow rate of about 40 liters/hour. As a consequence, at a low rpm of an internal combustion engine with correspondingly low feeding quantities, stable injection would no longer be possible. Pressure limiting valves with a valve piston 3 lacking flat places 3*a* have the disadvantage that the pressure rises too fast.

Figure 2:
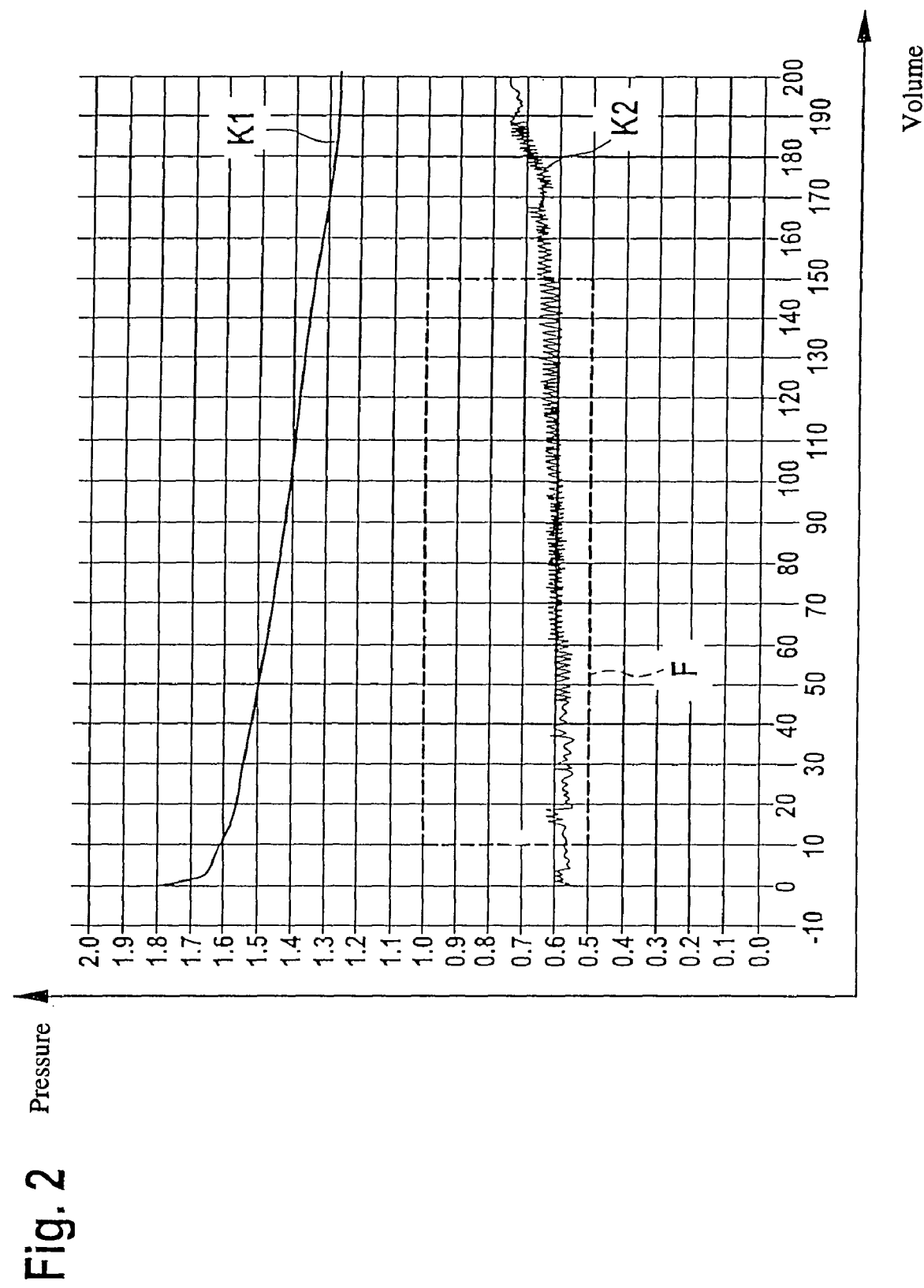
FIG. 2, in a graph, the functional relationship between pressure and flow rates for the pressure limiting valve of FIG. 1.

The advantage of the construction according to the invention is illustrated by the graph shown in FIG. 2, which shows the functional relationship between pressure and flow rate. On the X axis of the rectangular coordinate system shown in FIG. 2, pressure values are plotted in arbitrary units; on the Y axis, the flow rate or volumetric flow is shown, again in arbitrary units. The curve K1 represents the functional relationship between these variables in normal operation. The curve K2 illustrates the relationship in emergency operation. The curve K2 clearly shows that the pressure limiting valve designed according to the invention enables satisfactory emergency operation over a wide emergency operation window F.

In a further exemplary embodiment of the invention, which is shown in FIG. 3, flat places 3*a*. 1 are provided on the outer jacket of the valve piston 3 that extend over the entire length of the valve piston 3. In the exemplary embodiment shown in FIG. 1, the flat places 3*a* extend over only a portion of the length of the valve piston 3.

Figure 4:
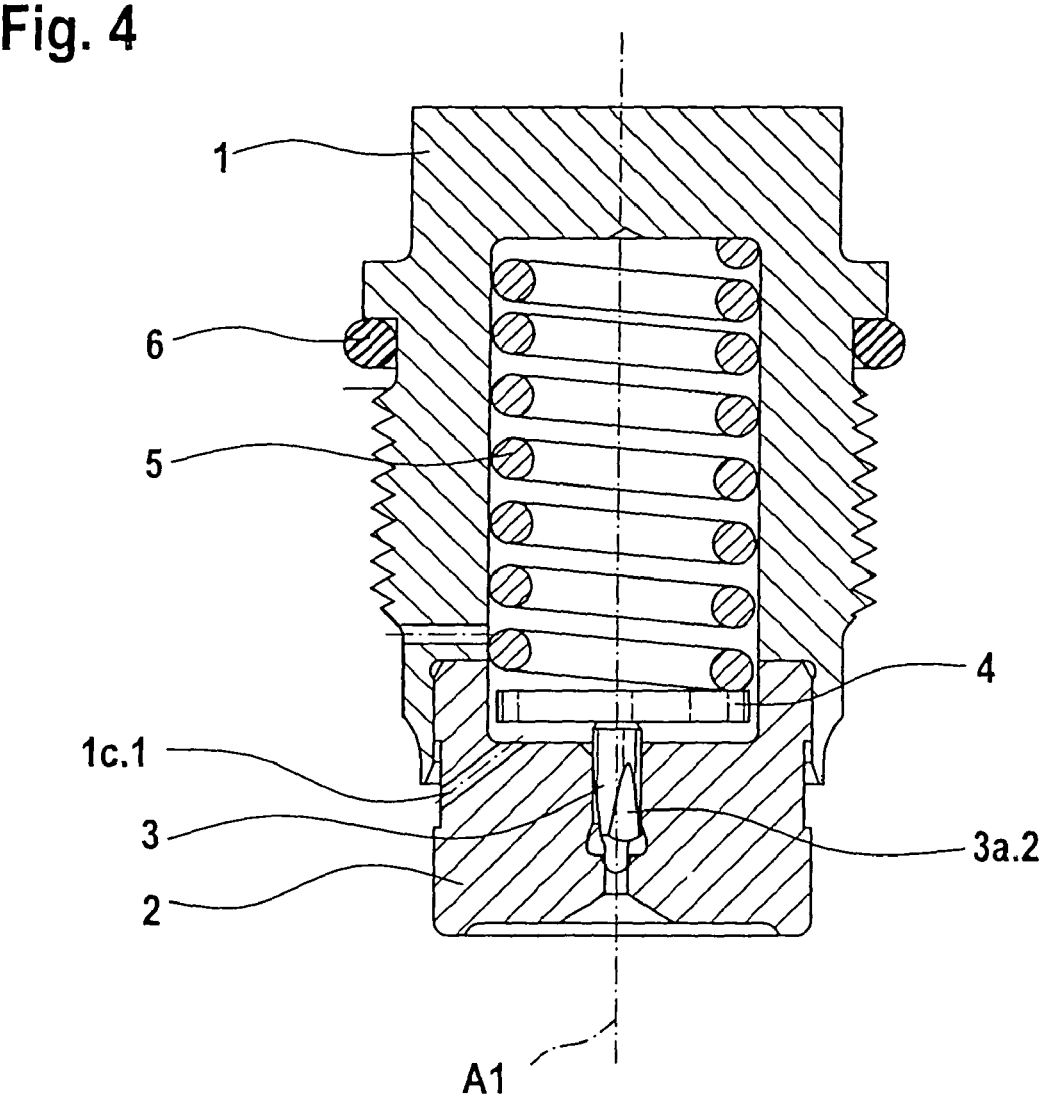
FIG. 4, a further exemplary embodiment of the invention, with flat places oriented at an angle relative to the longitudinal axis of the piston.

In a further exemplary embodiment of the invention, which is shown in FIG. 4, flat places 3*a*.2 are provided on the outer jacket of the valve piston 3 that are oriented at an angle relative to the longitudinal axis of the valve piston 3. Depending on the position of the valve piston 3, the result is a more or less large cross-sectional area for the passage of fuel. As FIG. 4 also shows, an outflow conduit 1*c*.1 can alternatively be disposed in the valve insert 2 as well.

Figure 5:
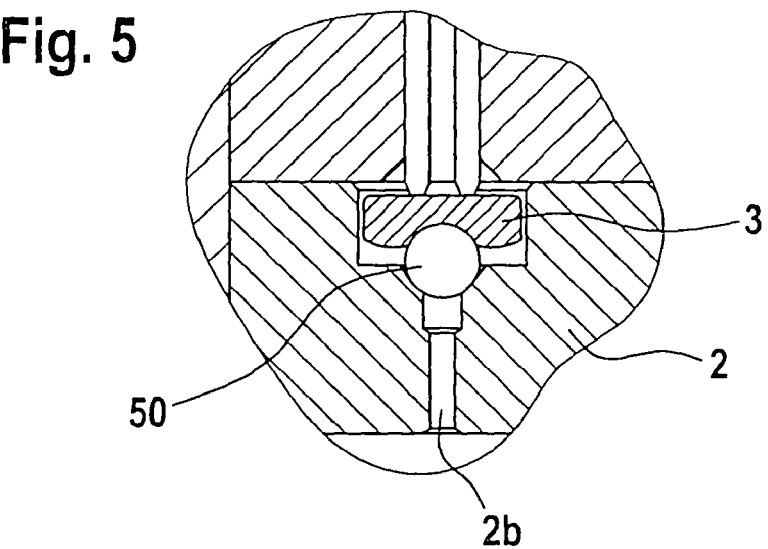
FIG. 5, a further exemplary embodiment of a pressure limiting valve, with a ball, loaded by a piston, for closing the valve opening.

In an advantageous further feature of the invention, a piston does not directly take on the sealing function of the pressure limiting valve 10. Instead, the valve opening is closed by a ball, which in turn is acted upon by a spring-loaded piston. This is illustrated in FIG. 5, which shows a larger detail, in cross section, of a pressure limiting valve designed in this way. A ball 50 is supported in a seat in the valve insert 2 and thus closes a valve opening 2b. The ball 50 is in turn acted upon a spring-loaded valve piston 3, which presses the ball 50 into its seat.

Figure 6:
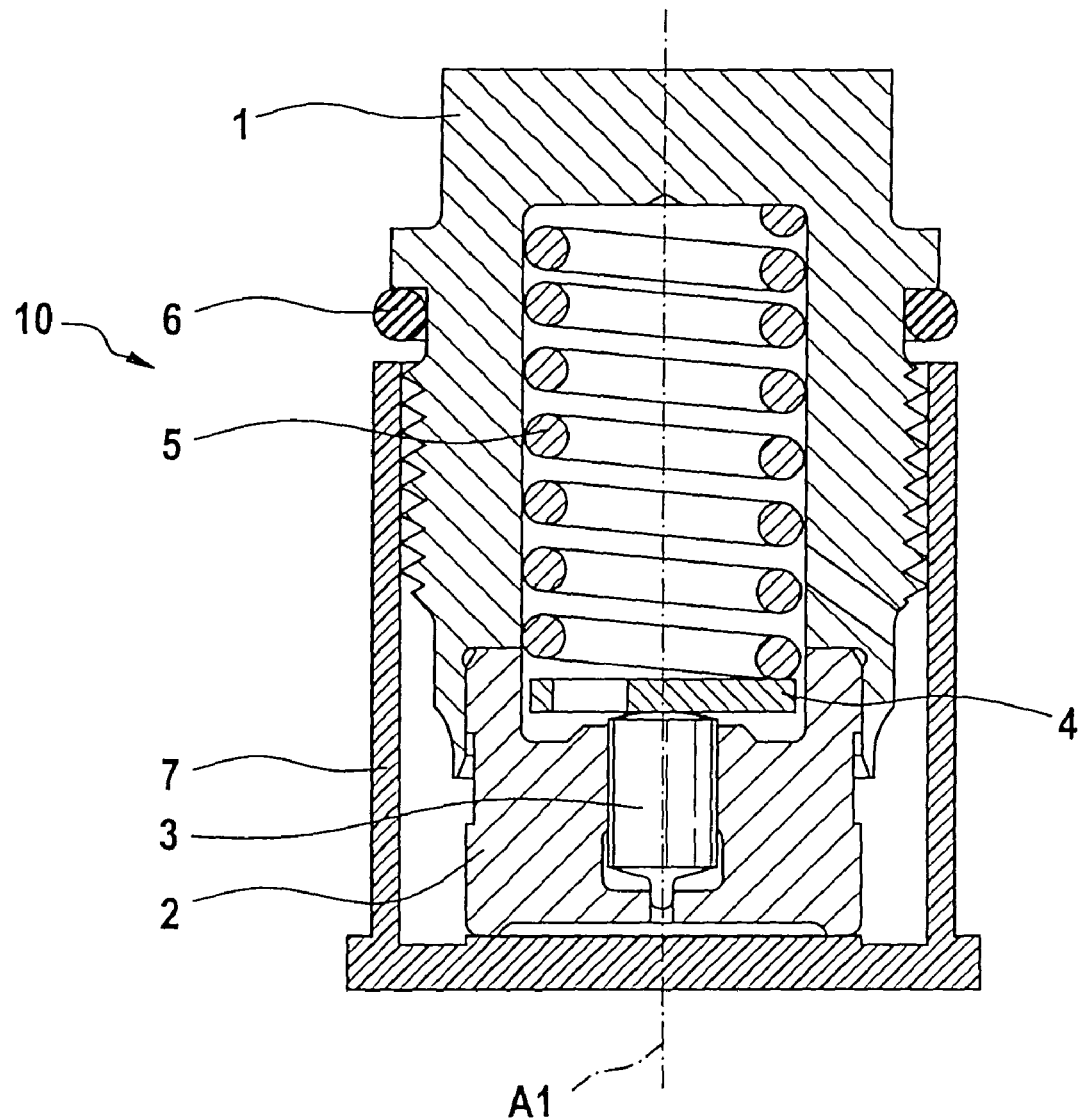
FIG. 6, a further exemplary embodiment of a pressure limiting valve, with a piston without flat places.

FIG. 6 shows a further exemplary embodiment of the invention. This is a simplified and therefore more-economical variant of the pressure limiting valve already described in conjunction with FIG. 1. The pressure limiting valve 10 shown in FIG. 6 includes a valve piston 3 that is slidably supported in the valve insert 2. The valve piston 3 is shaped essentially circular-cylindrically and has no flat places on its outer circumference.

Figure 7:
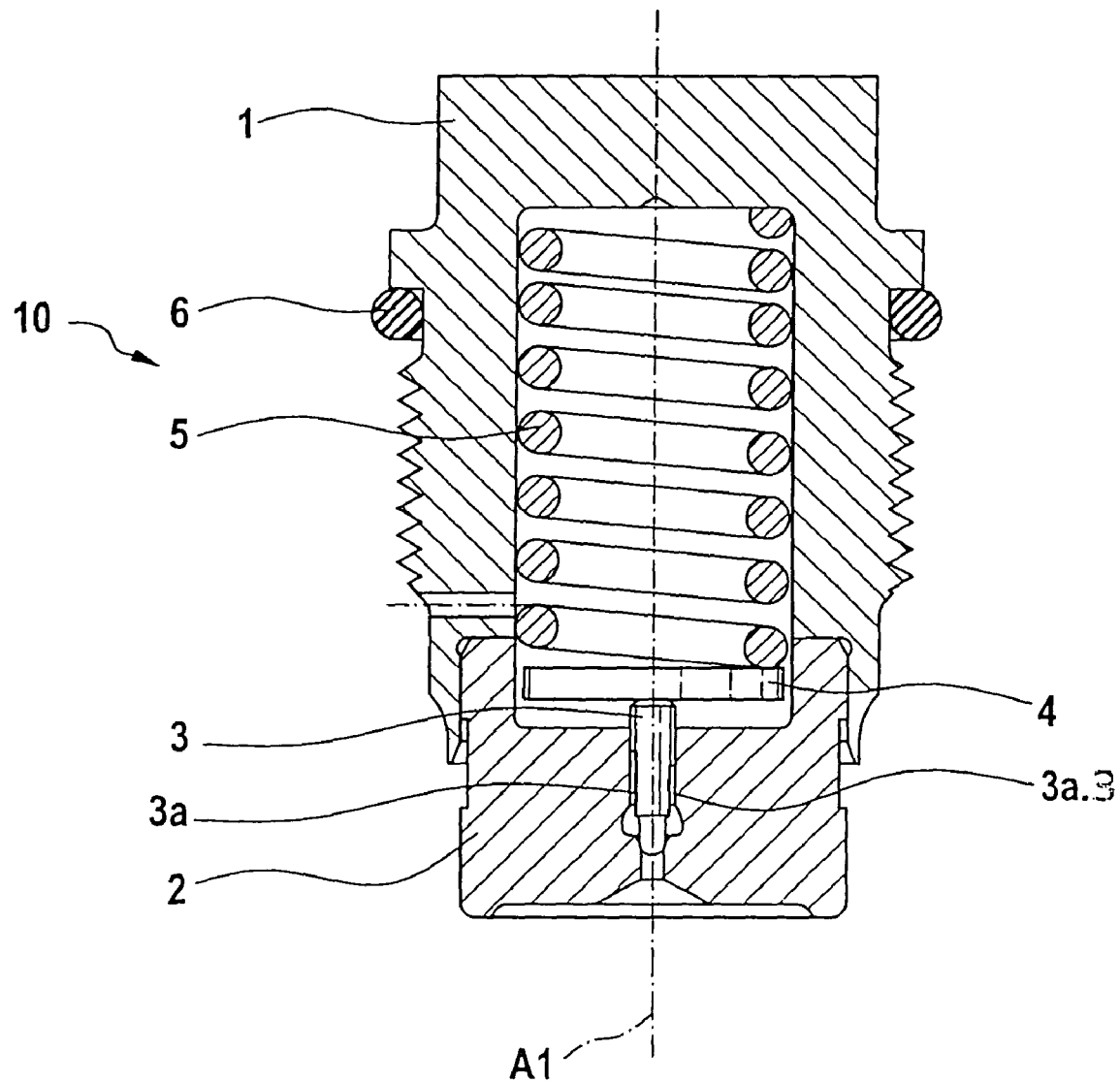
FIG. 7, a further exemplary embodiment of a pressure limiting valve, in which the piston has flat places and control edges.

An advantageous further feature of a pressure limiting valve is shown in FIG. 7. The valve piston 3 slidably supported in the valve insert 2 of the pressure limiting valve 10 has a plurality of flat places 3*a*, 3*a*.3 over its circumference, whose control edges have a variable spacing [different for each control edge] from the end face, toward the compression spring 5, of the valve piston 3. Accordingly, upon motion of the valve piston 3, the flat places 3*a*, 3*a*.3 come into action at different times. This embodiment is possible both with flat places that extend parallel to the longitudinal axis of the valve piston 3 and with flat places oriented obliquely to the longitudinal axis of the valve piston 3.

Figure 8:
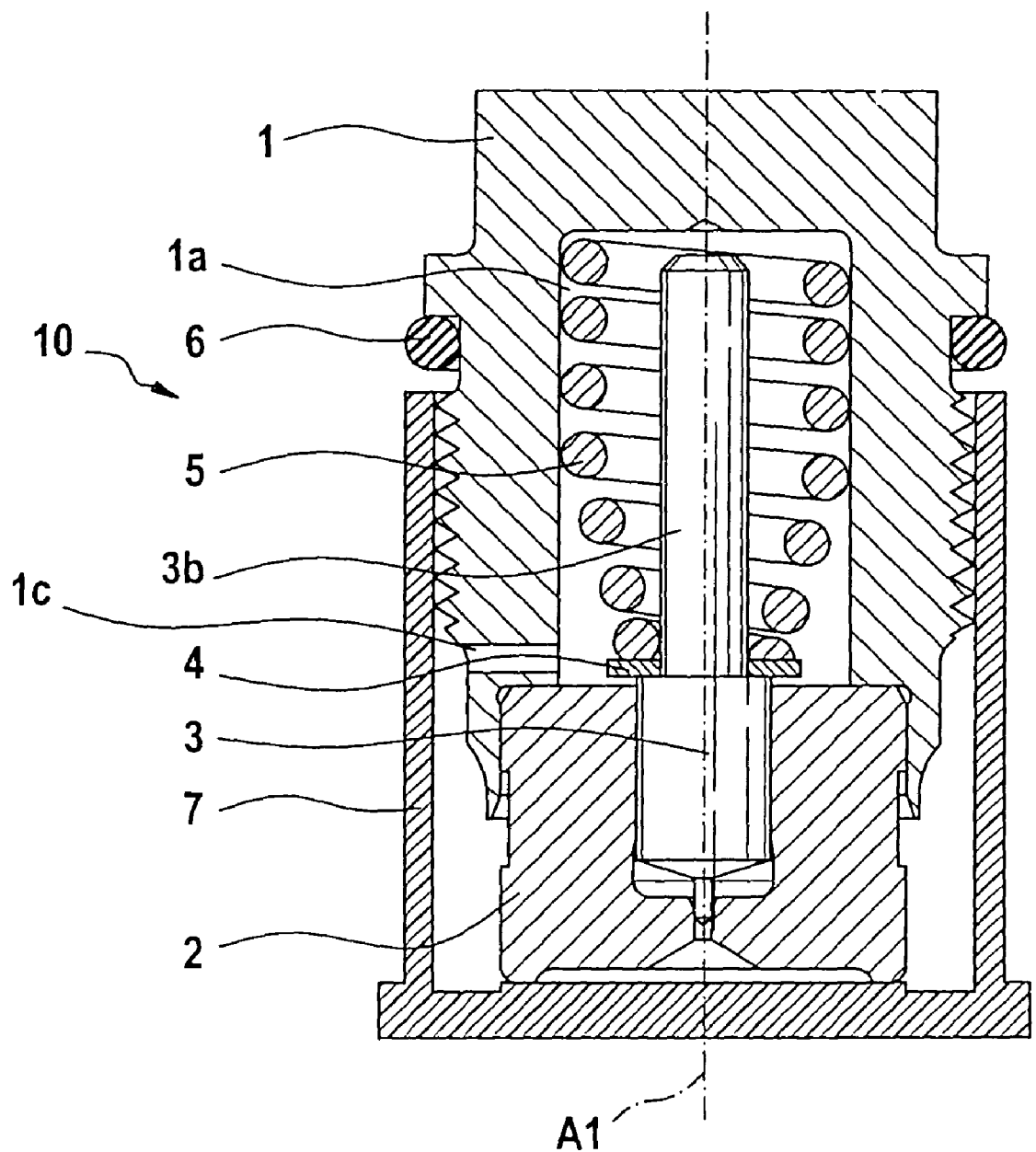
FIG. 8, a further exemplary embodiment of a pressure limiting valve, in which a conically embodied compression spring concentrically surrounds a piston rod that is connected to the piston.

In FIG. 8, a further exemplary embodiment of a pressure limiting valve designed according to the invention is shown. The even sturdier construction, compared to the exemplary embodiment of FIG. 1, of a pressure limiting valve includes a valve piston 3 with a piston rod 3b, which is disposed concentrically to the compression spring 5 and protrudes into the partial chamber 1a of the valve holder 1. The compression spring 5 is embodied as a conical spring and is braced with its larger base on the cup bottom of the valve holder 1. With its smaller base, it rests on an adjusting shim 4, which is slipped onto the piston rod 3b of the valve piston 3 and rests there on a step. However, this pressure limiting valve is not suitable for emergency operation.

Figure 9:
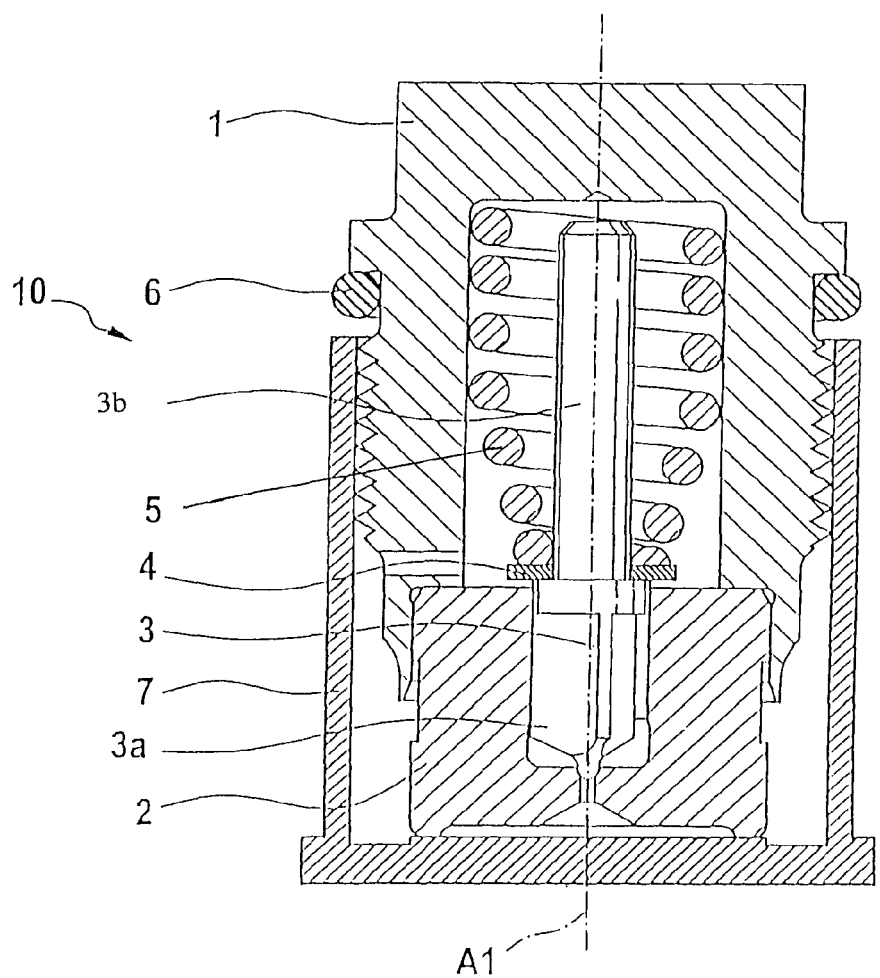
FIG. 9, a refinement of the exemplary embodiment shown in FIG. 8, in which the piston has flat places and/or control edges.

FIG. 9 shows a further variant of this pressure limiting valve, in which the valve piston 3 has flat places 3a.

The foregoing relates to preferred exemplary embodiments of the invention, it being understood that other variants and embodiments thereof are possible within the spirit and scope of the invention, the latter being defined by the appended claims.

The invention claimed is:

1. A pressure limiting valve (10), consisting of
a single piece valve holder (1) having a longitudinal axis (A1),
a single piece valve insert (2) connected to the valve holder (1),
a single piece valve piston (3) supported slidably in the valve insert (2),
a compression spring, acting upon the valve piston (3) with a pressure force acting in the closing direction, and
a single piece adjusting shim (4) disposed between the valve piston (3) and the compression spring (5) such that the compression spring (5) is braced on one end on a bottom piece of the valve holder (1) and on the other on a face of the adjusting shim (4) facing away from the valve piston (3),
wherein the valve holder (1) is cup-shaped and a cylindrical wall of the valve holder has at least two subregions (1a, 1b), each with a different inside diameter (D1, D2), and the subregions (1a, 1b) merge with one another in steplike fashion,
wherein the subregion (1b) of the valve holder (1) embraces the valve insert (2) from the outside, so that the steplike transition of the valve holder (1) formed by the different diameter regions (diameters D1, D2) is seated on and surrounds a portion of the valve insert (2) for establishing the connection between the valve insert (2) and the valve holder (1),
wherein the valve holder (1) has an outflow conduit (1c) in the cylindrical wall of the valve holder, the outflow conduit being oriented at an oblique angle with respect to the longitudinal axis (A1) of the valve holder (1), and
wherein the valve piston (3) has an end surface and a outer cylindrical circumferential surface, and at least one flat place (3a, 3a.1, 3a.2, 3a.3) is provided on the outer cylindrical circumferential surface of the valve piston (3), and wherein the flat places (3a) extend over only a portion of the length of the valve piston (3).

2. A pressure limiting valve (10), consisting of
a single piece valve holder (1) having a longitudinal axis (A1),
a single piece valve insert (2) connected to the valve holder (1),
a single piece valve piston (3) supported slidably in the valve insert (2),
a compression spring, acting upon the valve piston (3) with a pressure force acting in the closing direction, and
a single piece adjusting shim (4) disposed between the valve piston (3) and the compression spring (5) such that the compression spring (5) is braced on one end on a bottom piece of the valve holder (1) and on the other on a face of the adjusting shim (4) facing away from the valve piston (3),
wherein the valve holder (1) is cup-shaped and a cylindrical wall of the valve holder has at least two subregions (1a, 1b), each with a different inside diameter (D1, D2), and the subregions (1a, 1b) merge with one another in steplike fashion,
wherein the subregion (1b) of the valve holder (1) embraces the valve insert (2) from the outside, so that the steplike transition of the valve holder (1) formed by the different diameter regions (diameters D1, D2) is seated on and surrounds a portion of the valve insert (2) for establishing the connection between the valve insert (2) and the valve holder (1),
wherein the valve holder (1) has an outflow conduit (1c) in the cylindrical wall of the valve holder, the outflow conduit being oriented at an oblique angle with respect to the longitudinal axis (A1) of the valve holder (1), and
wherein three flat places (3a, 3a.1, 3a.2, 3a.3) are provided on the outer circumference of the valve piston (3), which flat places are distributed uniformly over the circumference of the valve piston (3), the flat places (3a) being disposed on the valve piston (3) such that they extend parallel to the longitudinal axis of the valve piston (3).

3. The pressure limiting valve of claim 2, wherein the valve insert (2) has a cup-shaped recess (2a), in which the adjusting shim (4) is slidably supported.

4. The pressure limiting valve of claim 2, wherein the first subregion (1a) of the valve holder (1) having the lesser inside diameter (D1) serves to receive the compression spring (5); and that the second subregion (1b) having the greater inside diameter (D2) embraces the valve insert (2) from outside.

5. The pressure limiting valve of claim 2, wherein the valve holder (1) and the valve insert (2) are calked to one another.

6. The pressure limiting valve of claim 2, wherein the valve holder (1) and the valve insert (2) are screwed together.

7. The pressure limiting valve of claim 2, wherein the flat places (3a, 3a.1, 3a.2, 3a.3) are oriented at an angle relative to a longitudinal axis of the valve piston (3).

8. The pressure limiting valve of claim 2, wherein the adjusting shim (4) has a fluid-passable recess (4a).

9. The pressure limiting valve of claim 8, wherein the recess (4a) is disposed eccentrically.

10. The pressure limiting valve of claim 2, wherein an outflow conduit (1c) is provided in the valve insert (2).

11. The pressure limiting valve of claim 2, wherein the valve piston (3) includes a piston rod (3b), which protrudes into the cup-shaped recess (partial chamber 1a) of the valve holder (1).

12. The pressure limiting valve of claim 11, wherein the compression spring (5) concentrically surrounds the piston rod (3b) of the valve piston (3).

13. The pressure limiting valve of claim 11, wherein the adjusting shim (4) is slipped onto the piston rod (3b) of the valve piston (3) and rests there on a steplike seat.

14. The pressure limiting valve of claim 2, wherein the compression spring (5) is embodied as a conical spring.

15. A pressure limiting valve (10), consisting of
a single piece valve holder (1) having a longitudinal axis (A1),
a single piece valve insert (2) connected to the valve holder (1),
a single piece valve piston (3) supported slidably in the valve insert (2),
a compression spring, acting upon the valve piston (3) with a pressure force acting in the closing direction, and
a single piece adjusting shim (4) disposed between the valve piston (3) and the compression spring (5) such that the compression spring (5) is braced on one end on a bottom piece of the valve holder (1) and on the other on a face of the adjusting shim (4) facing away from the valve piston (3),
wherein the valve holder (1) is cup-shaped and a cylindrical wall of the valve holder has at least two subregions (1a, 1b), each with a different inside diameter (D1, D2), and the subregions (1a, 1b) merge with one another in steplike fashion,
wherein the subregion (1b) of the valve holder (1) embraces the valve insert (2) from the outside, so that the steplike transition of the valve holder (1) formed by the different diameter regions (diameters D1, D2) is seated on and surrounds a portion of the valve insert (2) for establishing the connection between the valve insert (2) and the valve holder (1),
wherein the valve holder (1) has an outflow conduit (1c) in the cylindrical wall of the valve holder, the outflow conduit being oriented at an oblique angle with respect to the longitudinal axis (A1) of the valve holder (1), and
wherein the valve insert (2) has a cup-shaped recess (2a), in which the adjusting shim (4) is slidably supported.

16. A pressure limiting valve (10), consisting of
a single piece valve holder (1) having a longitudinal axis (A1),
a single piece valve insert (2) connected to the valve holder (1),
a single piece valve piston (3) supported slidably in the valve insert (2),
a compression spring, acting upon the valve piston (3) with a pressure force acting in the closing direction, and
a single piece adjusting shim (4) disposed between the valve piston (3) and the compression spring (5) such that the compression spring (5) is braced on one end on a bottom piece of the valve holder (1) and on the other on a face of the adjusting shim (4) facing away from the valve piston (3),
wherein the valve holder (1) is cup-shaped and a cylindrical wall of the valve holder has at least two subregions (1a, 1b), each with a different inside diameter (D1, D2), and the subregions (1a, 1b) merge with one another in steplike fashion,
wherein the subregion (6b) of the valve holder (1) embraces the valve insert (2) from the outside, so that the steplike transition of the valve holder (1) formed by the different diameter regions (diameters D1, D2) is seated on and surrounds a portion of the valve insert (2) for establishing the connection between the valve insert (2) and the valve holder (1),
wherein the valve holder (1) has an outflow conduit (1c) in the cylindrical wall of the valve holder, the outflow conduit being oriented at an oblique angle with respect to the longitudinal axis (A1) of the valve holder (1), and
wherein the valve insert (2) has a cup-shaped recess (2a), in which the adjusting shim (4) is slidably supported, and
wherein the diameter of the adjusting shim is greater than the diameter of the steplike transition so that the steplike transition holds the adjusting shim within the cup-shaped recess.

\* \* \* \* \*